US008658935B2

(12) United States Patent
Battisti et al.

(10) Patent No.: US 8,658,935 B2
(45) Date of Patent: Feb. 25, 2014

(54) WELDING PROCESS WITH JERK COMPENSATION

(75) Inventors: Charles R. Battisti, Gladstone, MO (US); Gary Barnhart, Roeland Park, KS (US)

(73) Assignee: Chemetron-Railway Products, Inc., Kansas City, MO (US)

( * ) Notice: Subject to any disclaimer, the term of this patent is extended or adjusted under 35 U.S.C. 154(b) by 767 days.

(21) Appl. No.: 12/615,581

(22) Filed: Nov. 10, 2009

(65) Prior Publication Data

US 2010/0155372 A1 Jun. 24, 2010

Related U.S. Application Data

(60) Provisional application No. 61/140,792, filed on Dec. 24, 2008.

(51) Int. Cl.
*B23K 11/04* (2006.01)
*E01B 29/44* (2006.01)
*E01B 29/46* (2006.01)

(52) U.S. Cl.
USPC .................. 219/89; 219/53; 219/54; 219/55

(58) Field of Classification Search
None
See application file for complete search history.

(56) References Cited

U.S. PATENT DOCUMENTS

| 3,982,091 A | 9/1976 | Zollinger |
| 4,103,139 A | 7/1978 | Zollinger |
| 4,215,260 A | 7/1980 | Zollinger |
| 4,270,036 A | 5/1981 | Zollinger |
| 4,414,454 A | 11/1983 | Zollinger |
| 4,716,836 A | 1/1988 | Hardt |
| 4,751,794 A | 6/1988 | Clem |
| 4,753,424 A | 6/1988 | Sato et al. |
| 4,762,263 A | 8/1988 | Oishibashi et al. |
| 4,841,116 A | 6/1989 | Kimura et al. |
| 4,854,088 A | 8/1989 | Clem |

(Continued)

FOREIGN PATENT DOCUMENTS

| EP | 0253634 A | 1/1988 |
| EP | 0499019 B1 | 2/1996 |

(Continued)

OTHER PUBLICATIONS

Holland LP, Rail Welding Group, "Mobile flash butt welding," obtained from the internet at http://www.hollandco.com/rail-welding-services on Sep. 14, 2007.

*Primary Examiner* — Johannes P Mondt
(74) *Attorney, Agent, or Firm* — Leydig, Voit & Mayer, Ltd.

(57) ABSTRACT

An improved welding head for creating an in-track weld between a first rail segment and a second rail segment includes a controller having computer-readable instructions read by the controller. The computer-readable instructions include instructions for compensating for rail jerk during in-track welding. The welding head includes a closing force actuator, such as a hydraulic cylinder, for moving the rail segments toward one another. A pressure transducer is monitored during welding to determine a closing force. An impending jerk of the rail movement is detected if an abnormal closing force change is observed, and in response the flow of hydraulic fluid into or out of the hydraulic cylinder is restricted to prevent or minimize the jerk. In addition, when an impending jerk is detected the weld current may be temporarily increased to burn or prevent the formation of short circuit paths between the rails.

7 Claims, 5 Drawing Sheets

(56) References Cited

U.S. PATENT DOCUMENTS

| | | |
|---|---|---|
| 4,929,816 A | 5/1990 | Theurer et al. |
| 4,983,801 A | 1/1991 | Theurer et al. |
| 5,099,097 A | 3/1992 | Theurer |
| 5,175,405 A | 12/1992 | Karimine et al. |
| 5,189,798 A | 3/1993 | La Force |
| 5,195,436 A | 3/1993 | Valditerra |
| 5,270,514 A | 12/1993 | Wechselberger et al. |
| 5,389,760 A | 2/1995 | Zollinger |
| D365,429 S | 12/1995 | Ninstil |
| 5,575,416 A | 11/1996 | Oellerer et al. |
| 5,577,954 A | 11/1996 | Okumura et al. |
| 5,756,903 A | 5/1998 | Norby et al. |
| 5,877,468 A | 3/1999 | Morlock |
| 5,979,738 A | 11/1999 | Kuchuk-Yatsenko et al. |
| 5,992,329 A | 11/1999 | Scheuchzer et al. |
| 6,069,333 A | 5/2000 | Morlock |
| 6,163,003 A | 12/2000 | Battisti |
| 6,166,347 A | 12/2000 | Morlock |
| 6,180,910 B1 * | 1/2001 | Derby, Jr. .................. 219/86.51 |
| 6,207,920 B1 | 3/2001 | Morlock |
| 6,278,074 B1 | 8/2001 | Morlock et al. |
| 6,396,020 B1 | 5/2002 | Thelen et al. |
| 6,407,364 B1 | 6/2002 | Mumaw |
| 6,515,249 B1 | 2/2003 | Valley et al. |
| 6,570,118 B2 | 5/2003 | Sauron et al. |
| 6,762,390 B2 | 7/2004 | Theurer et al. |
| 6,787,726 B2 | 9/2004 | Thelen et al. |
| 6,852,940 B1 | 2/2005 | Mühlleitner |
| 6,886,470 B2 | 5/2005 | Norby et al. |
| 7,123,990 B2 | 10/2006 | Thelen |
| 7,253,380 B2 | 8/2007 | Miller |
| 2002/0125216 A1 | 9/2002 | Sauron et al. |
| 2002/0170884 A1 | 11/2002 | Thelen et al. |
| 2003/0141283 A1 | 7/2003 | Theurer et al. |
| 2004/0010342 A1 | 1/2004 | Thelen |
| 2005/0067381 A1 | 3/2005 | Coomer |
| 2005/0173419 A1 | 8/2005 | Miller |
| 2006/0011732 A1 | 1/2006 | Baumert et al. |
| 2006/0016858 A1 | 1/2006 | Statnikov et al. |
| 2006/0191875 A1 | 8/2006 | Thelen |
| 2006/0261044 A1 | 11/2006 | Theurer et al. |
| 2006/0288899 A1 | 12/2006 | Theurer et al. |
| 2007/0007251 A1 | 1/2007 | Kral et al. |

FOREIGN PATENT DOCUMENTS

| | | |
|---|---|---|
| EP | 0504580 A | 9/1996 |
| EP | 0597215 B1 | 11/1996 |
| EP | 1063045 A | 12/2000 |
| EP | 1342529 A | 9/2003 |
| WO | WO 2006/063651 A1 | 6/2006 |

* cited by examiner

WELDING PROCESS WITH JERK COMPENSATION

CROSS-REFERENCE TO RELATED APPLICATIONS

This patent application claims the benefit of U.S. Provisional Patent Application No. 61/140,792, filed Dec. 24, 2008, which is incorporated by reference.

TECHNICAL FIELD

This disclosure relates generally to systems and methods for flash butt welding of railway rails and, more particularly, to an in-track welding system for executing consistent flash butt welding in adverse temperature and track conditions.

BACKGROUND

Welding of railroad rails is often used to join two rail sections together as a railway is built or repaired. One type of welding is commonly referred to as flash butt welding. During flash butt welding, the two rails ends to be joined are first heated and then forged together, expelling liquid metal and oxides from the weld joint. The forged joint is sheared to remove the flash, which is solidified material that was forced out of the joint during forging.

As the weld surfaces are prepared during certain steps in the flash butt welding process, the rate at which the rail material is manipulated will have a significant impact on weld quality. For example, if the rail segments are moved together too slowly during certain steps, the heated surfaces may oxidize, reducing eventual weld strength. Similarly, if the rail segments are moved together too quickly, the weld will be made at temperature too low to allow the weld to be homogenous from one segment to the other, resulting in occlusions, fractures, and other problems. Thus, it is important to ensure that the rail segment ends are moved at prescribed rates of travel during certain steps of the welding process.

Some present-day welding control systems utilize welding current as a process variable for closed-loop control of the rate of rail displacement during certain steps of the welding process. The welding current between the two rails is measured and if it is found to exceed a target value, the relative velocity of the two rails is deemed to be too high and the rail closing speed (the relative rate at which the two rails are moved toward one another) is reduced. If the welding current is found to be less than the target value, the relative velocity of the two rails is deemed to be too low, and the rail closing speed is increased. The rail closing speed can be controlled by a setting of a hydraulic proportional valve that feeds the closing cylinders on the welding system, and thus the required control output comprises a signal to the hydraulic proportional valve to open or close to some degree. In addition to the closed-loop feedback control based on current, there may be limits placed on the extent to which the control output to the hydraulic proportional valve can change, in order to prevent the system from becoming unstable, i.e., to avoid rate oscillations.

However, in practice, feedback control of the rail movement based on current is not always sufficient to account for and manage the variety of field conditions encountered during welding. For example, the inventors have observed that in some circumstances feedback control based on measured current is not adequate to respond to rapidly changing conditions of the rails, and in some cases the current measured by the welding head does not always adequately represent the current traveling between the rails and contributing to their heating. Thus, an improved control scheme for ensuring consistency of weld quality under varying field conditions is needed.

When considering this background section, the disclosure and claims herein should not be limited by the deficiencies of the prior art. In other words, the solution of those deficiencies, while desirable, is not a critical limitation of any claim except where otherwise expressly noted in that claim. Moreover, while this background section is presented as a convenience to the reader who may not be of skill in this art, it will be appreciated that this section is too brief to attempt to accurately and completely survey the entirety of the prior art. The preceding background description is thus a simplified and anecdotal narrative and is not intended to replace printed references in the art. To the extent an inconsistency or omission between the demonstrated state of the printed art and the foregoing narrative exists, the foregoing narrative is not intended to cure such inconsistency or omission. Rather, applicants would defer to the demonstrated state of the printed art.

SUMMARY

In an aspect of the disclosed innovations, a welding head is disclosed for creating an in-track weld between a first rail segment and a second rail segment, the welding head. The welding head includes two or more clamp assemblies connected by a closing actuator capable of drawing the clamp assemblies together through a closing force exerted by the closing actuator. The head further includes a controller for causing the in-track weld to be executed, and the controller includes a processor and computer-readable instructions read by the processor comprising instructions for executing a number of steps. These steps include applying a voltage difference between the first rail segment and the second rail segment, and actuating the closing actuator to cause the first rail segment and the second rail segment to move toward each other so that when the first rail segment and the second rail segment approach one another a current is passed between them. The closing force is monitored and if the controller determines that the closing force has changed faster than a threshold rate of change, thereby indicating an impending rail movement jerk, it actuates the closing actuator to decrease the closing force.

In another aspect, a method for creating an in-track weld between a first rail segment and a second rail segment is provided. The method is executed via a welding head having two clamp assemblies connected by a closing actuator. The method includes a number of steps including applying a voltage difference between the first rail segment and the second rail segment, actuating the closing actuator to create a closing force causing the first rail segment and the second rail segment to move together such that a current begins flowing between the first rail segment and the second rail segment, and maintaining the rate of movement of the first rail segment relative to the second rail segment so that the current passing between them is maintained close to a predetermined value. It also includes measuring the closing force and determining that the closing force has increased faster than a threshold rate of increase thereby indicating an impending rail movement jerk. In this case, the closing actuator is actuated to decrease the closing force regardless of the current between the first rail segment and the second rail segment.

In a further aspect of the disclosed principles, a method is provided for compensating for rail jerk during in-track welding of a first rail segment to a second rail segment via a welding head having one or more closing actuators for moving the first rail segment and the second rail segment together. The method includes monitoring the closing force exerted by the one or more closing actuators during in-track welding of the first rail segment to the second rail segment, and actuating the one or more closing actuators to decrease the closing force, if an increase of greater than a predetermined limit in the closing force is detected, to maintain the closing velocity of the rail segments and lessen bridging between the rails.

Other features and advantages flowing from the disclosed principles will be appreciated from the following description, taken in conjunction with the drawings, of which:

DETAILED DESCRIPTION

Figure 1:
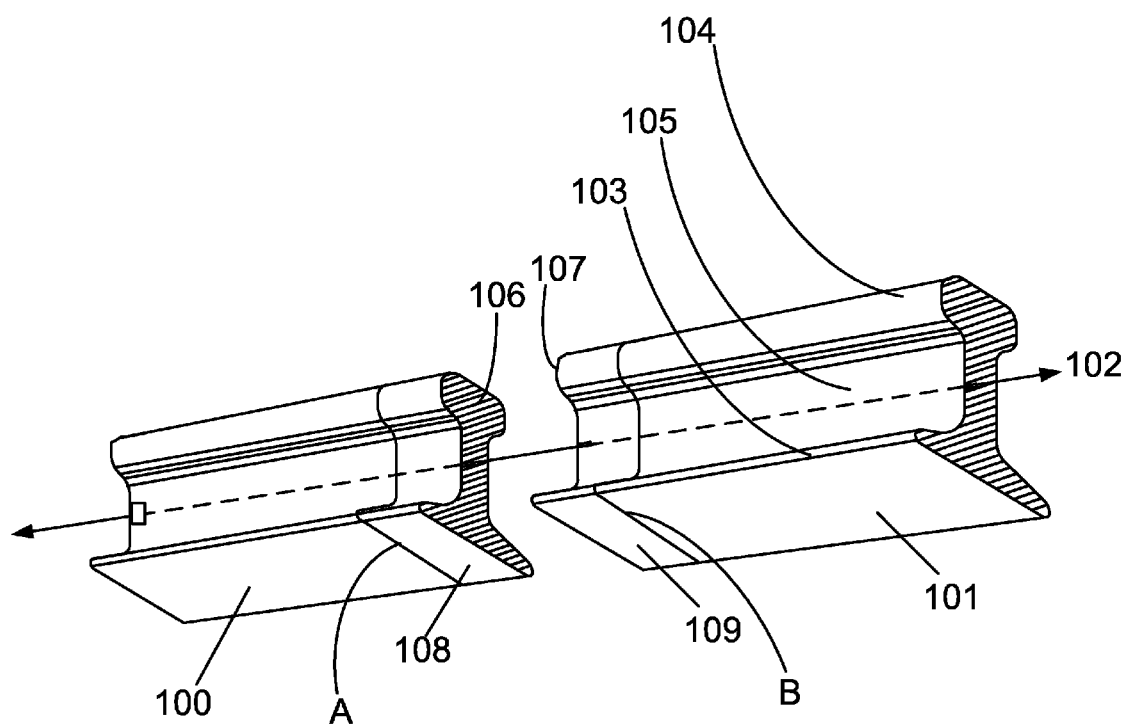
FIG. 1 is a perspective view of two rail segments in position for flash butt welding in accordance with the disclosed principles.

Railroad tracks are comprised of a pair of side-by side, continuous steel rails which can be formed by welding together segments of rail in a welding process such as flash butt welding. FIG. 1 is a perspective view of two rail segments in position for flash butt welding in accordance with the disclosure. In particular, a first rail segment 100 and a second rail segment 101 are shown aligned with one another along the perpendicular rail axis 102 with a slight space between the first rail segment 100 and the second rail segment 101. Each of the first rail segment 100 and the second rail segment 101 includes a rail base section 103 as well as a rail head section 104. The rail base section 103 and the rail head section 104 are interconnected via a rail web section 105. The rail base section 103 and the rail web section 105 provide strength to the rail generally and also provide surface area for joints between rail segments such as between the first rail segment 100 and the second rail segment 101. The rail head section 104 provides additional strength to the rail and provides additional surface area for joining, but also provides a support plane upon which rail wheels will run when the railway is completed.

Large rail segments created during in-plant welding may be transported to a railway location and joined in series to create a finished railway. The final welding of these rail segments is performed in-track, meaning that the tracks are already laid down, end-to-end, on a railway bed and the welding is typically performed as part of a long sequence of steps to lay down a new railway. In-track welding is also used to repair or modify existing railways. A truck can be outfitted with a mobile welding head for performing in-track flash butt welding. The truck can arrive at the job site either by riding on roads, or by riding on the tracks via a set of hi-rail wheels.

In-track welding in accordance with the disclosed structure is performed by heating the rail ends to allow the ends to be forged together under force. In the illustration of FIG. 1, the first rail segment 100 has a first rail end 106, and the second rail segment 101 has a second rail end 107 (obscured in perspective view by second rail segment 101). During in-track welding, a region at the end of each rail of interest is heated. In the illustrated example, a first region 108 adjacent first rail end 106, roughly delineated by line A, is heated, as is a second region 109 adjacent second rail end 107, roughly delineated by line B. The longitudinal extent of the first region 108 and the second region 109 are exaggerated in FIG. 1 for clarity. The rails are then welded together by forcing the first rail end 106 and the second rail end 107 together under high force while they remain heated.

Figure 2:
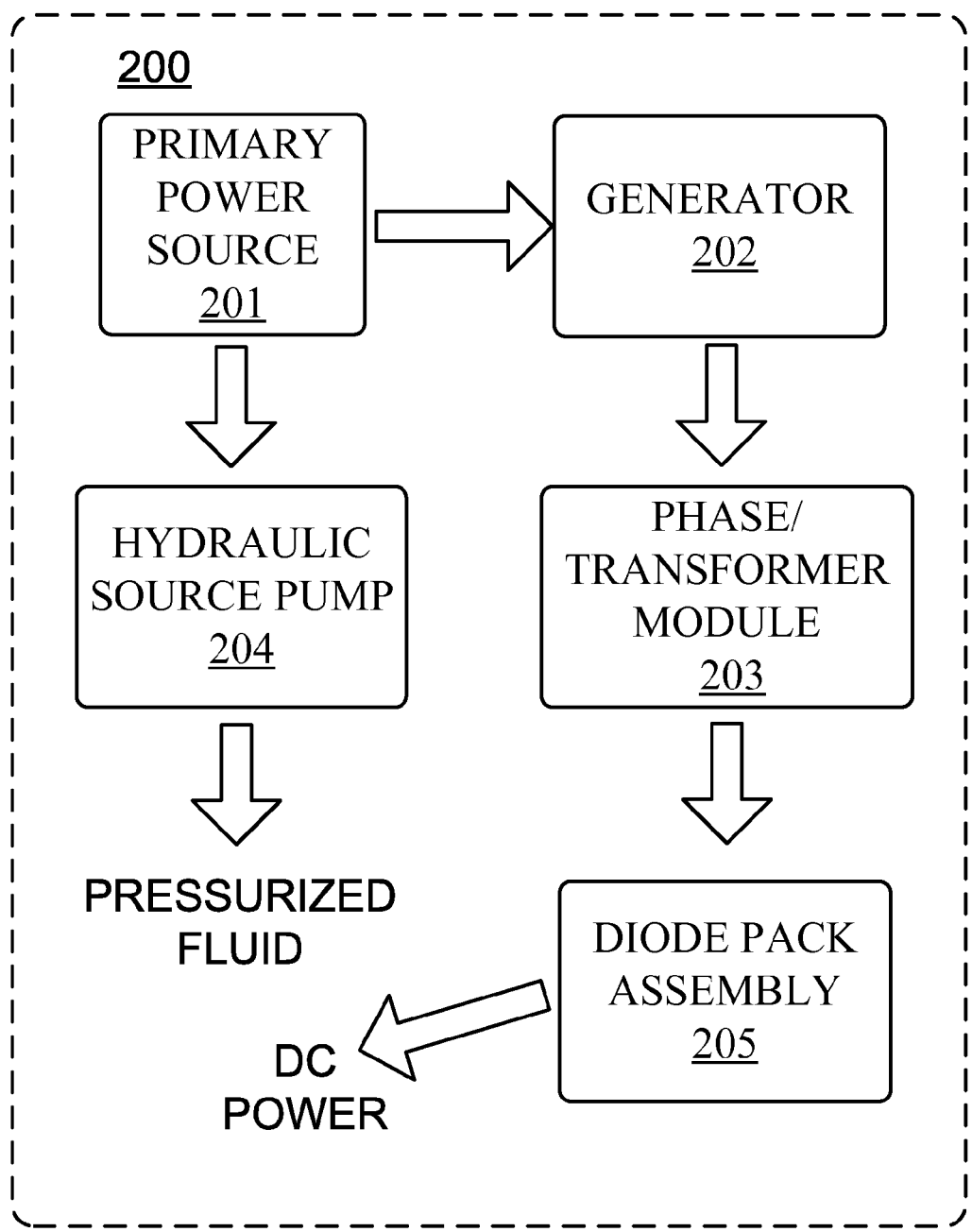
FIG. 2 is a schematic system diagram of an in-track welding system within which the presently disclosed principles may be implemented.

Prior to discussing the weld control process improvements in greater detail, the steps of a typical flash butt welding procedure will be briefly discussed in general terms to aid the reader's later understanding. In conjunction with the present discussion, reference is made to FIG. 2, which shows a schematic view of an in-track welding energizing system 200 in accordance with the disclosure. The in-track welding energizing system 200 comprises a number of electrical energy generation and transformation elements. In particular, the in-track welding energizing system 200 includes a primary power source 201, e.g., an internal combustion engine. The primary power source 201 is typically a dedicated power source, i.e., it is not used for transportation but only for the in-track welding energizing system 200. However, in an alternative embodiment, the primary power source 201 may also be used for functions outside of the in-track welding energizing system 200. The primary power source 201 may also drive a hydraulic source pump 204 to provide pressurized hydraulic fluid to the welding system. The pressurized hydraulic fluid is used for the operations that require motion, such as moving the rails and shearing the weld joint.

The primary power source 201 provides rotational energy to drive a generator 202. When thus driven, the generator 202 provides an alternating current (AC) electrical power output consistent with its construction. For example, in an embodiment, the generator 202 provides a 3-phase high-voltage (480V) AC output. The AC output of the generator 202 is first processed by a phase/transformer module 203, e.g., an SCR bridge comprising SCRs and diodes, into a single phase high voltage (e.g., 550V) high frequency (e.g., 1200 Hz) AC output. The AC output of the phase/transformer module 203 is provided to and processed by a diode pack assembly 205. The diode pack assembly 205 comprises a transformer to step down the voltage of the input, as well as one or more rectifying circuit elements such as diodes to transform the signal from AC to DC. The welding current may be controlled by controlling settings of the "inverter," i.e., the rectifying circuit elements.

Pursuant to the transformation of the electrical power from AC to DC, the output of the diode pack assembly 205 is a low voltage DC power signal. In an embodiment, the output of the diode pack assembly 205 has an open-circuit voltage between about 5 and about 12 volts, e.g., 8 volts. The current output by the diode pack assembly 205 may be 30,000 amps or higher. Utilization of phase/transformer module 203 and diode pack assembly 205 are only exemplary of the ways in which the output of generator 202 can be converted into an output useful for in-track welding. Those of ordinary skill in this art will be able to select other electrical transformation arrangements to suit a particular need or circumstance.

During an in-track welding operation, the DC output of the diode pack assembly 205 is applied to a junction between rail segments, e.g., first rail segment 100 and second rail segment 101. At the initiation of a weld cycle, the rail ends of interest are brought together until they touch slightly, as determined by the presence of a weld current draw. After contact, an amount of material, e.g., 0.25 inches, is removed from the two rail ends during what is referred to as a "burn off" stage. This step aids in the elimination of oxidation, grease, and other contaminants between the rail ends, and also serves to square uneven saw cuts so that the rail ends may be heated evenly.

Once the ends are prepared, the process of heating for welding begins in the heat flash stage, referred to as "flashing." During the flashing process, the rail ends do not firmly contact one another, but rather are moved toward each other at a relatively slow controlled rate. The welding current is maintained at a level sufficient to melt and vaporize small areas of the rail ends that form contact points. This occurs in many places across the rail face at any given moment, forming a protective vapor shield that prevents oxidation of the hot, reactive rail faces.

After initial flashing, a progressive flash stage begins. In this stage, an increase in the feed rate causes an increase in the number of contact points being melted and vaporized. The increase in metal vapor causes an increase in the protective shield that helps prevent oxides from forming on the rail faces. At the same time, flashing crater depth is reduced, leaving less material to be forged away.

After the rail ends have been sufficiently heated and the surface cratering reduced by progressive flashing, the rails are forged at a high feed rate. The welding current may be left energized for some period of time, e.g., 1.5 seconds, after the start of this stage. This helps ensure that the hot rail surfaces are protected from oxidation immediately prior to forging.

Full forging force is applied to the rails for a predetermined period of time, e.g., nine (9) seconds, known as "holding time." The travel of the rails is stopped by the resistance of the heated rail ends, and as such the rail ends are forged together until there is no further plastic deformation. Experience has shown that a forging force of about 9000 pounds per square inch exerted on the face of the two rail ends will yield favorable results. Thus, for example, the forging force required for 115# rail may be approximately 51 tons, while the forging force required for larger 141# rail may be about 63 tons.

During forging, oxides and liquid steel are expelled from the weld joint, typically resulting in a three-part weld burr. Two outer portions of the burr are formed by plastic deformation of soft material of the two rails, while a center portion is formed by metal expelled in a liquid state from the center of the weld joint. After the weld is sufficiently firm but while the burr material is still hot, the welding head can optionally shear the burr from the weld joint.

Figure 3:
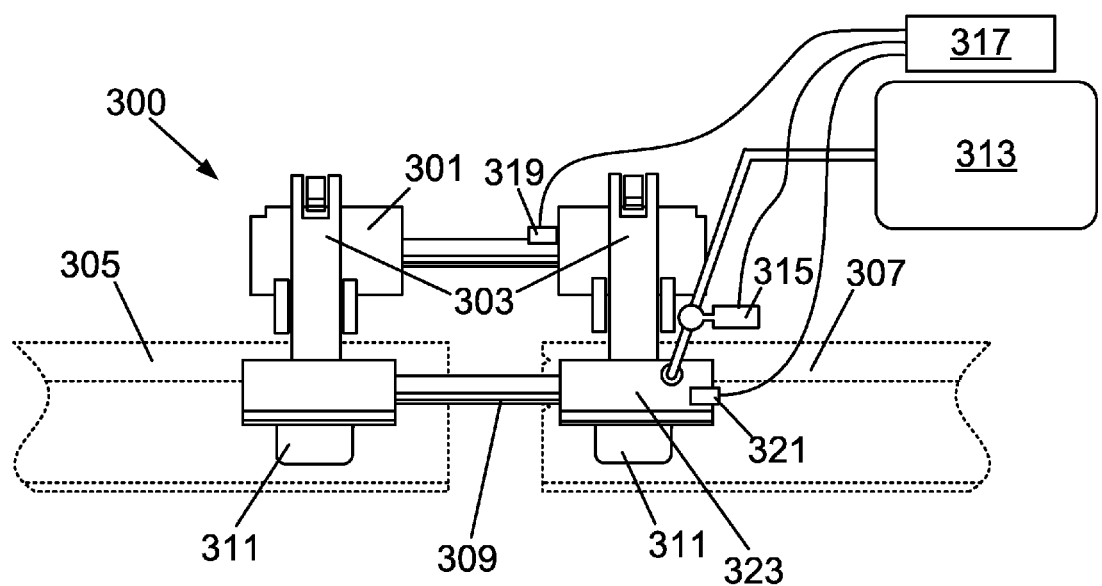
FIG. 3 is a schematic illustration of an exemplary welding head usable in an implementation of the disclosed principles.

Although the structure of the welding head is not critical nor forms a part of this invention, an understanding of the basic structure of a flash butt welding head will assist in understanding the weld control process improvements discussed in greater detail hereinafter. FIG. 3 illustrates an exemplary welding head in schematic form. The welding head 300 includes a body 301 from which extend two or more clamps 303. Each clamp 303 is actuated by one or more clamp actuators, not shown, to clamp against the first rail segment 305 or the second rail segment 307. Actuation of the clamps 303 via a hydraulic cylinder (not shown) is common, but those of skill in this art will appreciate that the clamps 303 may instead be actuated by another mechanism, e.g., an electric motor running a ball-screw mechanism, a geared rack and pinion, etc.

The clamps 303 are connected via two or more closing actuators, such as hydraulic closing actuators 309, one of which is visible, the other of which is obscured behind the visible hydraulic closing actuator 309. In an embodiment, each hydraulic closing actuator 309 includes at least one hydraulic force cylinder 323. The hydraulic closing actuators 309 are designed at least to exert a closing force between the first rail segment 305 and the second rail segment 307, drawing the rail segments toward one another. The closing actuator could also comprise other mechanisms for exerting a closing force between the rail segments 306, 307, as will be understood by those of ordinary skill in this art.

Initially, the welding head 300 is positioned such that one of the clamps 303 is adjacent the first rail segment 305 and another is adjacent the second rail segment 307. When the weld process is to begin, the clamps 303 are clamped to the first rail segment 305 and second rail segment 307 respectively via the clamp actuators, locking the first rail segment 305 and second rail segment 307 into alignment with one another.

Once the rail segments are constrained by the welding head 300, the remaining steps of the weld process are executed by actuating the hydraulic closing actuators 309 in conjunction with the application of a weld current across the joint between the first rail segment 305 and the second rail segment 307. For example, as a voltage difference, e.g., 8 volts, is applied across the rail segments, the first rail segment 305 and second rail segment 307 are moved together in a controlled fashion via the hydraulic closing actuators 309. The applied voltage causes an electrical current to flow, resistively heating the contacting faces of the rail segments. This resistive heating is used for a number of functions as the rails move together, including cleaning, squaring, preparing, and forging the rail segment ends as discussed above. The voltage is applied by electrical contacts 311 that may be integrated with or attached to the clamp sets 303.

Because the amount of heat and the temperature of rail ends 106, 107 is critical to ensuring a high quality weld, close control of the rate of heating is sought by precisely controlling the hydraulic closing actuators 309 and the application of the weld current between the first rail segment 305 and second rail segment 307. The rate of heating is roughly proportional to the current between the first rail segment 305 and second rail segment 307. The current is a function of how fast the rail ends 106, 107 are moving together, repeatedly forming new contact points for the current to flow. The rate of movement of the rail ends 106, 107 is a function of the closing force exerted by the hydraulic closing actuators 309, which is in turn a function of the hydraulic fluid pressure in the hydraulic closing actuators 309. Thus, the rate of heating can be controlled by manipulating the actuation of the hydraulic closing actuators 309 to affect the current between rail ends 106, 107.

The flow of hydraulic fluid into and out of the hydraulic closing actuators 309 is provided by a hydraulic source 313 generically illustrated in FIG. 3. The hydraulic source 313 may include the hydraulic source pump 204, a hydraulic tank or sump (not pictured), as well as one or more control valves 315 for throttling the flow of hydraulic fluid. While both source pressure and valve position have an effect on the hydraulic fluid flow rate, the one or more control valves 315 typically exhibit a shorter response time than any control of hydraulic source pump 204, so a common practice is to maintain the hydraulic source pump 204 to provide hydraulic fluid at a constant pressure, and to use the valve position of control valves 315 principally to control the flow of hydraulic fluid to hydraulic force cylinders 323.

The one or more control valves 315 may be electrically actuated proportional valves where the opening of the valve is proportional to an applied control current, voltage, PWM signal, etc. Control valves 315 could also be pilot operated control valves or another type of control valve as may be convenient for a particular system architecture. A controller 317 controls the one or more control valves 315. Control valves 315, controller 317, and the hydraulic closing actuators 309 are only exemplary of systems for controlling the closing force exerted by the welding head on the rails. Those of ordinary skill in this art will be able implement other systems for exerting a closing force on the rails.

The position of control valves 315 has in the prior art been controlled directly by the sensed current. When the sensed current passing between the rails is higher than a threshold, or predetermined, value, the signal to the control vales 315 is decreased a proportional amount to proportionally close control valves 315 so that less hydraulic fluid flows to hydraulic closing actuators 309, which results in less pressure in hydraulic force cylinders 323, which results in less closing force exerted on the rails, which in turn results in a slower closing speed of the rails and eventually a reduced current. When the sensed current passing between the rails is lower than a threshold value, the signal to the control vales 315 is increased a proportional amount to proportionally open control valves 315 to increase the closing speed of the rails and eventually to increase the current. Of course, this control principle can likewise be put into effect by manipulating different valves which control the passage of hydraulic fluid to and from the rod and head ends of the hydraulic force cylinders 323. In this manner, the current passing between the rails, and therefore the rate of heating, is kept close to a constant, predetermined target rate.

With the foregoing overview of the welding process and structures in mind, the following description of the control processes may be more easily understood. It will be appreciated that all process steps prescribed in or associated with the figures and/or description herein are executed by the controller 317, which is a computing device having a processor executing computer-executable instructions read from a computer-readable medium, e.g., a magnetic or optical disk, tape, RAM, ROM, hard drive, etc. As used herein, the term "computer-readable medium" includes human-tangible media such as those listed above and others, and excludes human-intangible media (e.g., acoustic waves, RF waves, electrical signal waves, etc.) unless otherwise noted.

Figure 4:
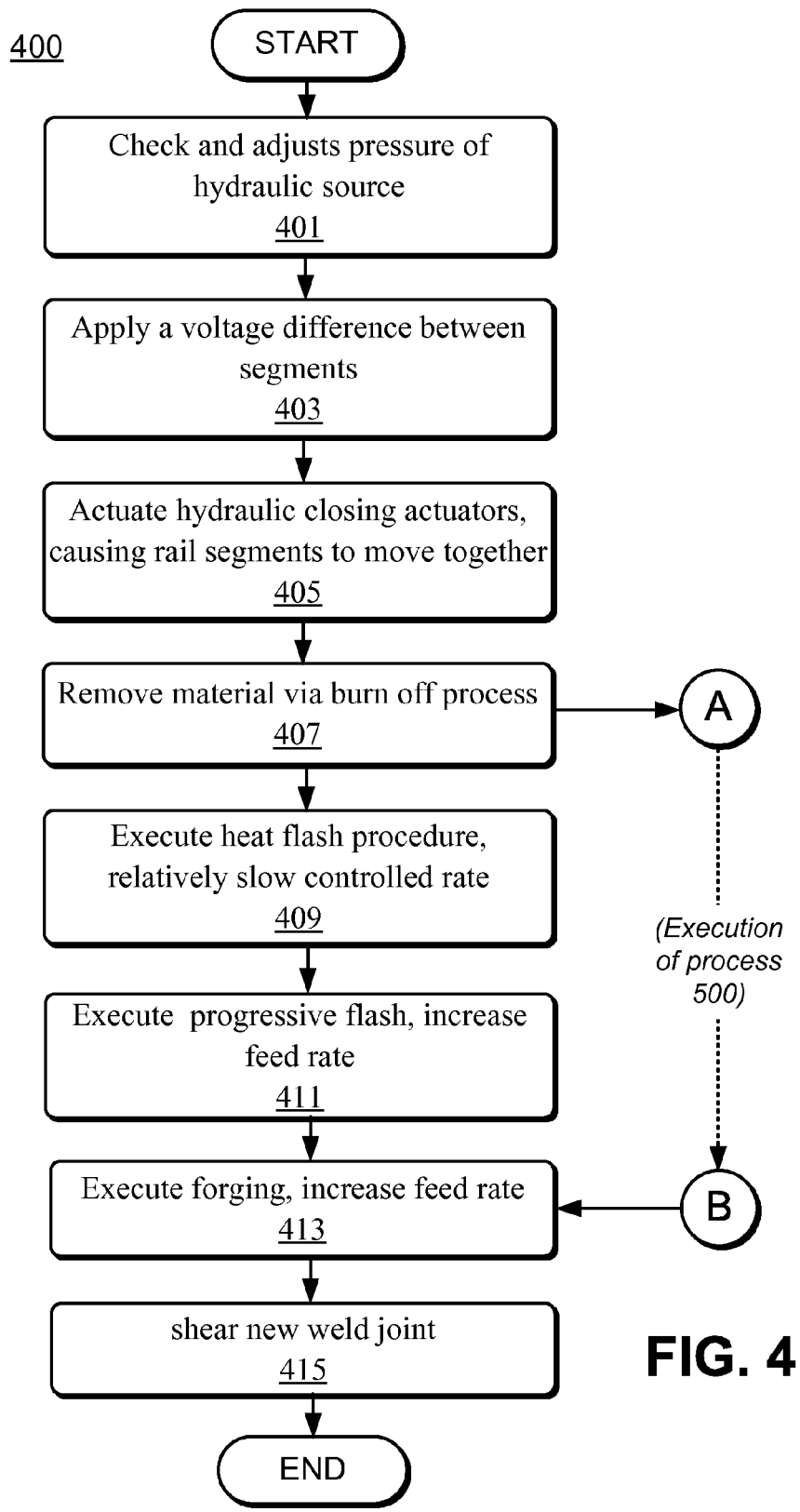
FIG. 4 is a flow chart illustrating a welding process in accordance with the disclosed principles.

FIG. 4 illustrates a process 400 for executing a rail welding operation in keeping with the disclosed principles. At stage 401 of the process 400, the controller 317 optionally checks and adjusts the pressure of the hydraulic source 313, if necessary. Although stage 401 is illustrated as occurring at the outset of the process 400, it will be appreciated that this stage may occur at some other point in the process 400, or executed periodically through out the process 400.

While continuing to ensure that the pressure of the hydraulic source 313 stays within an acceptable range, the process 400 flows to stage 403 and begins execution of a weld by applying a voltage difference between the first rail segment 305 and the second rail segment 307. At stage 405, the controller 317 actuates the one or more hydraulic closing actuators 309 with a control signal to the one or more control valves 315, causing the first rail segment 305 and the second rail segment 307 to move together such that the ends to be welded are abutting. As the one or more hydraulic closing actuators 309 move the first rail segment 305 and the second rail segment 307 together, the commencement of contact between the rail segments may be sensed by the onset of a current between the rail segments or by another means as will be appreciated by those of skill in the art.

Once the rail segments are in contact, the controller 317 begins the heating stages of the welding process 400 at stage 407 by removing a small amount of material from the abutting rail ends via a burn off process to eliminate oxidation, grease, and other contaminants between the rail ends, and also potentially to square unevenly cut rail ends. The controller 317 executes this stage by moving the rail segments together via the one or more hydraulic closing actuators 309 while allowing sufficient weld current to cause the touching surfaces to burn off.

Once the rail ends are prepared, the controller 317 executes a heat flash procedure at stage 409 by moving the rail ends toward each other at a relatively slow and controlled rate. The rate of closing of rail ends 307, 309 is controlled, as previously described, to maintain the current between the rail ends 307, 309 close to a predetermined target rate. The target welding current is sufficient to melt and vaporize small areas of the rail ends that form contact points. This typically occurs in many places across the rail face at any given moment, forming a protective shield that prevents accelerated oxidation of the hot rail faces.

After heat flashing, the controller 317 executes a progressive flash procedure at stage 411 by increasing the current and closing speed of the rail segments 306, 307, causing an increase in the number of contact points being melted and vaporized at the interface between the rail segments. The increase in metal vapor causes an increase in the protective shield that helps eliminate oxides from forming on the rail faces and reduces flashing crater depth, leaving less material to be forged away.

Once the rail ends have been sufficiently heated and the surface cratering reduced by progressive flashing, the process 400 flows to stage 413 to execute a forging procedure. In the forging procedure, the controller 317 may increase the closing speed to its maximum level, and the rails are forged at this high feed rate. The weld voltage/current may be terminated shortly (e.g., 1.5 seconds) after stage 413 commences. When the rails stop at the end of the forging process due to the limits of plastic deformation in the rail segments, the controller 317 may actuate one or more hydraulic actuators at stage 415 to shear the new weld joint flush with the surrounding rail material, after which the process 400 terminates.

Controlling the rate of heating by sensing current and adjusting the closing speed of the rail segments 306, 307 to maintain a target current is, as the inventors have observed, not always sufficient to account for the irregularities and varying circumstances of welding in the field. For example, as the rails are dragged over different obstacles and terrain during the welding process, following the closing movement of rail segments 306, 307 under the closing force exerted by the welding head, the friction of the rails against the obstacles and terrain can change rapidly. As explained before, the closing speed of the rail ends is a function of the closing force exerted by the hydraulic closing actuators 309, but it is also a function of the friction force which tends to cancel out the closing force. As the rail is dragged forward toward the weld joint, it can hang up on obstacles, stretch, and then suddenly release. The sudden release is characterized by a rapid decrease in the friction force, and as a result a rapid change in the acceleration rate of the rail closing motion. Such a discontinuity in the rail acceleration is called jerk. Under the described current control scheme, the rail segments 306, 307 may accelerate rapidly before the increasing current can cause the welding head to react and close the control valves 315. The rapid, uncontrolled acceleration can result in the rail ends forming a permanent bridge which cannot be burned away with the available electrical current.

As another example, the sensed current may not always be representative of the current actually flowing between the rail segments 306, 307 and contributing to heating. In some field circumstances, a portion of the current can leak around the weld joint. This might occur as vehicles ahead of and behind the weld joint bridge between the rails being welded and an adjacent rail, allowing current to bypass around or shunt the weld joint. In this case, the sensed current may not be indicative of the true heat rate, and may result in heating that is too slow.

As yet another example, directly controlling the position of the proportional control valves 315 based directly on the sensed current does not take into account the viscosity of the hydraulic fluid. The flow rate of fluid into the hydraulic closing actuators 309 from the control valves 315 is a function of valve position, pressure differential across the valve, and viscosity of the fluid. As the temperature of the hydraulic fluid changes, its viscosity will vary and the effect of changing the proportional control signal to the control valves 315 will have a varying effect on hydraulic fluid flow rates and ultimately the pressure in hydraulic force cylinders 323 and the closing force exerted on the rails.

To mitigate the effects of rail jerk, a process 500 is executed in parallel with steps 407-411 to detect and correct any rail jerk before substantial disruption to the weld or weld process can occur. The flowchart of FIG. 5 illustrates the exemplary process 500 for accomplishing this goal.

The process 500 begins at node A and assumes an ongoing weld operation. At stage 501 of the process 500, the controller 317 monitors the instantaneous variance in closing force via one or more pressure transducers 321 (see FIG. 3) associated with the at least one hydraulic force cylinder 323 (Alternatively, where the closing actuators are nonhydraulic, another indicator of closing force may be used in this and subsequence steps). The pressure transducer 321 detects the pressure of hydraulic fluid inside of the hydraulic force cylinder 323 to give an indication of the closing force that is being exerted on the rails. The purpose of the monitoring step is to detect at step 503 any abnormal change, e.g., a drop exceeding a predetermined threshold percentage, in the sensed pressure. Such a drop in pressure would indicate a sudden release of the rail from an obstruction, etc. and a reduction in the friction force, and a resulting impending jerk of the rail motion. It may likewise be possible to detect an impending jerk by measuring the pressure of fluid inside of hydraulic force cylinder 323 which would increase as a result of a rapid decrease in friction force, such as might occur in the fluid on the head end side of the hydraulic force cylinder 323 if the rod side is pressurized to create the closing force.

Figure 5:
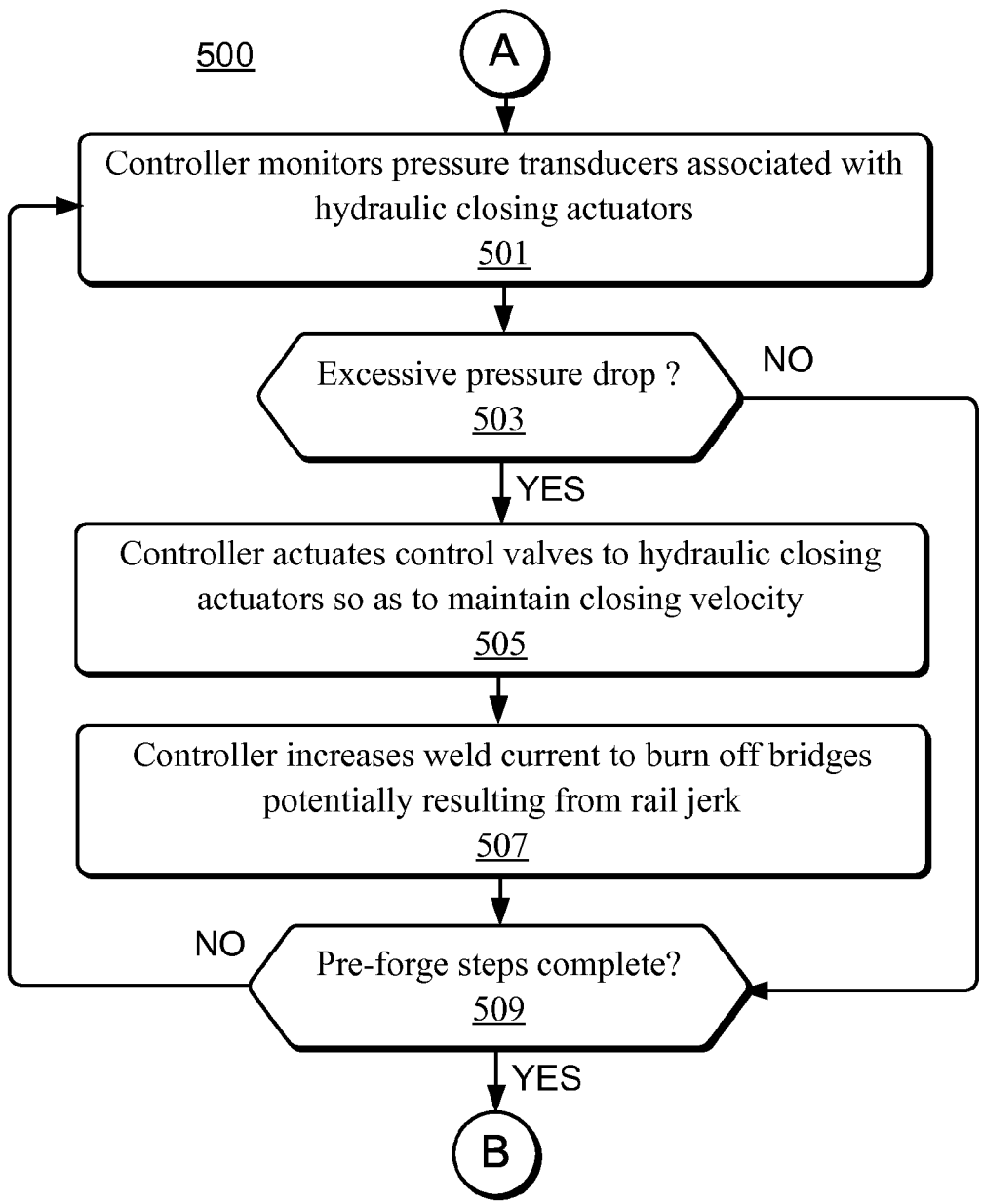
FIG. 5 is a flow chart illustrating a process of rail jerk compensation in accordance with the disclosed principles.

Continuing with the illustrated process steps in FIG. 5, if at stage 503 an abnormal pressure change is detected, then the process 500 flows to stage 505, wherein the controller 317 actuates the one or more control valves 315 to restrict the flow of hydraulic fluid into (and, possibly, out of) the hydraulic force cylinders 323 so as to maintain, or attempt to maintain, the closing velocity of the rails and avoid disruption to the weld. The magnitude of the change in the proportional signal to control valves 315 to react to a given change in pressure may be predetermined. For example, the relationship between pressure change and the required change in the proportional signal to control valves 315 can be determined empirically with respect to a given installation after the occurrence of one or more rail jerk incidents. There may be several predetermined values for the magnitude of change in the proportional signal, the selection of a particular predetermined value being based on the graded severity of the impending jerk. Alternatively, the magnitude of the change in the proportional signal could be calculated as a function of each abnormal pressure change event.

From stage 505, the process 500 flows optionally to stage 507, wherein the controller 317 temporarily increases the maximum available weld current in order to ensure the burning off any bridges that have formed or are forming because the rails moved together too quickly. After stage 507, the process 500 flows to stage 509, wherein the controller 317 determines whether all pre-forge steps, i.e., the burn-off, heat flash, and progressive flash, have been completed. If at stage 509 it is determined that all pre-forge steps, i.e., the burn-off, heat flash, and progressive flash steps, have been completed, the process 500 terminates at node B. Otherwise, the process 500 returns to stage 501, and continues to monitor the pressure transducers associated with the hydraulic closing actuators 309.

Thus, using the process 400 in conjunction with the parallel jerk mitigation process 500, consistent welds can be efficiently produced regardless of incidents, e.g., rail hang-ups etc., that would otherwise cause quality problems or process delays.

To address the problems of current shunting around the weld joint, and of variable hydraulic fluid temperature and viscosity, a sensor 319 associated with the welding head 300 may be provided to sense the separation distance of the clamps 303, or the closing speed of the clamps 303 relative to one another, or their position or speed relative to one of the rail segments, and communicates this value to the controller 317. The controller 317 may use this value to ensure that regardless of the sensed current, the closing speed of the rail segments 306, 307 is maintained within a band. Within the predetermined, acceptable band of closing speeds, the sensed current may be used to dictate the actual closing speed. But the sensed current will not be allowed to result in a closing speed that is less than or greater than the predetermined closing speed band for the particular process step in the overall welding process. In this manner, even if there is significant shunting of current around the weld joint, or even if the viscosity of the hydraulic fluid is very high or very low, the closing speed of rail segments 306, 307 will be maintained within a marginally acceptable range resulting in a marginally acceptable weld quality.

INDUSTRIAL APPLICABILITY

The present disclosure finds industrial applicability in systems for in-track welding of rail segments using a flash butt welding process. Although in the past, variable conditions found in field situations where in-track welding is performed were detrimental to weld quality, the control system proposed herein allows use of the in-track system in a wide array of field conditions while maintaining weld quality.

It will be appreciated that the foregoing description provides examples of the disclosed system and process. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method for creating, under control of a programmed controller, an in-track weld between a first rail segment and a second rail segment via a welding head having two clamp assemblies connected by a closing actuator, the two clamp assemblies being drawn together at a desired rate by the closing actuator, during an in-track weld operation, to cause the first rail segment and the second rail segment to approach one another and thereby enable an electrical current to pass between the first rail segment and the second rail segment, the method comprising:

applying a voltage difference between the first rail segment and the second rail segment;

actuating the closing actuator to exert a closing force causing the first rail segment and the second rail segment to approach such that the electrical current passes between the first rail segment and the second rail segment;

controlling a rate at which the two clamp assemblies are drawn together by the closing actuator so as to control relative movement of the first rail segment to the second rail segment to maintain the electrical current close to a predetermined electrical current value;

measuring, during the applying and actuating, a pressure relating to the closing force exerted by the closing actuator;

determining, as a result of the measuring, a rate of change value for the pressure relating to the closing force exerted by the closing actuator;

detecting, based upon the rate of change value, whether the closing force has changed faster than a threshold rate of change; and actuating in response to the detecting, a control element for the closing actuator to facilitate drawing the clamp assemblies together at the desired rate.

2. The method according to claim 1, wherein the closing actuator includes at least one hydraulic force cylinder, and wherein the control element is a control valve for allowing hydraulic fluid into or out of the hydraulic force cylinder, and wherein the method further comprises setting the control valve to allow hydraulic fluid to pressurize the at least one hydraulic force cylinder to create the closing force.

3. The method according to claim 2, the pressure relating to the closing force exerted the closing actuator is a hydraulic fluid pressure in the at least one hydraulic force cylinder measured by a pressure transducer.

4. The method according to claim 3, wherein detecting comprises detecting that the hydraulic fluid pressure in the at least one hydraulic force cylinder has increased beyond a predetermined extent.

5. The method according to claim 3, wherein detecting comprises detecting that the hydraulic fluid pressure in the at least one hydraulic force cylinder has decreased beyond a predetermined extent.

6. The method according to claim 3, wherein the actuating of the control element comprises setting the control valve associated with the hydraulic force cylinder to increase or decrease the flow of hydraulic fluid into or out of the hydraulic cylinder.

7. The method according to claim 1, further comprising temporarily increasing a maximum available electrical current that flows between the first rail segment and the second rail segment in response to the detecting.

* * * * *